United States Patent [19]
Holcombe

[11] 3,921,328
[45] Nov. 25, 1975

[54] LUMINESCENT FISHING LURE

[76] Inventor: Gordon B. Holcombe, 603 Santa Barbara Ave., Millbrae, Calif. 94030

[22] Filed: July 31, 1974

[21] Appl. No.: 493,322

Related U.S. Application Data

[63] Continuation-in-part of Ser. No. 364,748, May 29, 1973, Pat. No. 3,861,072.

[52] U.S. Cl. .............................. 43/17.6; 43/42.06
[51] Int. Cl.² ................................................ A01K 85/00
[58] Field of Search ......................... 43/17.6, 42.06

[56] References Cited
UNITED STATES PATENTS

| | | | |
|---|---|---|---|
| 1,422,841 | 7/1922 | Dey | 43/17.6 X |
| 2,569,465 | 10/1951 | Farr | 43/42.06 |
| 2,600,437 | 6/1952 | Siepe | 43/42.06 X |
| 3,576,987 | 5/1971 | Voight et al. | 43/17.6 X |

Primary Examiner—Hugh R. Chamblee
Assistant Examiner—Daniel J. Leach
Attorney, Agent, or Firm—Limbach, Limbach & Sutton

[57] ABSTRACT

An illuminated fishing lure for attracting fish, squid and other aquatic life, the lure being formed of a buoyant, chemiluminescent wand having a transparent, unweighted sheath with a curved tongue for causing the lure to submerge when it is pulled through the water. The wand has a first chemical in an inner frangible tube and a second chemical in an outer flexible casing encompassing the inner tube. When the outer casing is deformed, the inner tube is fractured, causing the chemicals to mix and generate a luminescence.

6 Claims, 4 Drawing Figures

LUMINESCENT FISHING LURE

CROSS-REFERENCE TO RELATED APPLICATION

This application is a continuation-in-part of my copending application entitled LUMINESCENT FISHING LURE, filed May 29, 1973, assigned Ser. No. 364,748 and issued Jan. 21, 1975 as U.S. Pat. No. 3,861,072.

BACKGROUND OF THE INVENTION

Fishing with lights attracts many fish which are indifferent to customary lures or bait. This is particularly true when fishing for squid which are unusually susceptible to the attraction of lights. To more effectively attract fish and the like to bait or an artificial lure, it is desirable that the light source be immersible in water. In this manner, the light source can be placed on a line as closely as desired to the bait or artificial lure. A chemiluminescent wand has been found to comprise an ideal device for an immersible light source and an illuminated fishing lure is described in my copending application referred to above.

Such a chemiluminescent wand makes use of certain reactions which produce a light emission termed chemiluminescence. The chemiluminescent reaction is wholly contained within a hermetically sealed container. In the present situation, where it is desired that the light source be immersible, this feature is of prime importance. An appropriate functional container for reactant chemiluminescent chemicals is disclosed by Heinz K. W. Voight et al in U.S. Pat. No. 3,576,987 issued May 4, 1971. In this patent is described a luminous wand having a flexible outer casing containing a frangible or breakable inner tube. Reactive chemiluminescent chemicals are separated and contained within the inner tube and between the inner tube and outer casing. When the inner tube is broken by bending the outer casing, the chemicals mix and luminescence is produced. The outer casing referred to herein will be deemed a flexible casing but it is to be understood that this term will also include a flexible tube with a frangible liner.

When used for a fishing lure, the chemiluminescent wand is activated by bending the wand, thereby fracturing the inner, frangible tube and allowing the chemicals to mix. The wand is then inserted in the lure device and attached to the line. One problem with such a lure is that the chemiluminescent wand is buoyant and therefore the lure described in my prior application will ordinarily not submerge without added weights. Furthermore, it has been found that the lure is more effective if it wobbles from side to side in a swimming motion. Since such lures are preferably to be manufactured as simply and cheaply as possible, the problem is to design a one-piece lure which will fully expose the luminance of the wand, will submerge the wand when the lure is drawn through the water, and which will move in the water in a wobbling fashion.

SUMMARY OF THE INVENTION

The above and other problems are overcome by the present invention of an illuminated fishing lure attachable to a fishing line and submergible in water for attracting fish, squid and other aquatic life comprising a chemiluminescent wand having a first chemical in an inner frangible tube and a second chemical in an outer flexible casing encompassing the inner tube, wherein the chemicals when mixed, by deforming the outer casing and fracturing the inner tube, generate a chemiluminescence, an adjustable tubular sheath mounted on the wand and encompassing a portion of the chemiluminscent wand, the sheath having a tongue portion, for causing the sheath and wand to dive when the sheath and lure are pulled relative to the water, and a skewed portion, for causing the sheath and wand to wobble when pulled relative to the water, and means for attaching the wand and sheath to a fishing line.

In one preferred embodiment the wand has a head of diameter greater than the diameter of the remaining wand at one end, the sheath has a detent which abuts against the wand head, and means are provided for attaching the wand and sheath to a fishing line including a flexible leader having a loop at one end which loops through a pair of holes adjacent one end of the sheath and restrains the wand at its end opposite to the head.

It is therefore an object of the invention to provide an inexpensive luminescent fishing lure;

It is another object of the invention to provide a luminescent fishing lure incorporating a chemiluminescent wand;

It is still another object of the invention to provide a luminescent fishing lure in which a chemiluminescent wand is carried by a transparent sheath shaped to wobble the lure while traveling through the water; and It is a still further object of the invention to provide a fishing lure sheath for a chemiluminescent wand wherein the sheath is so curved as to cause the wand and sheath to submerge when the sheath is drawn through the water.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

Figure 1:
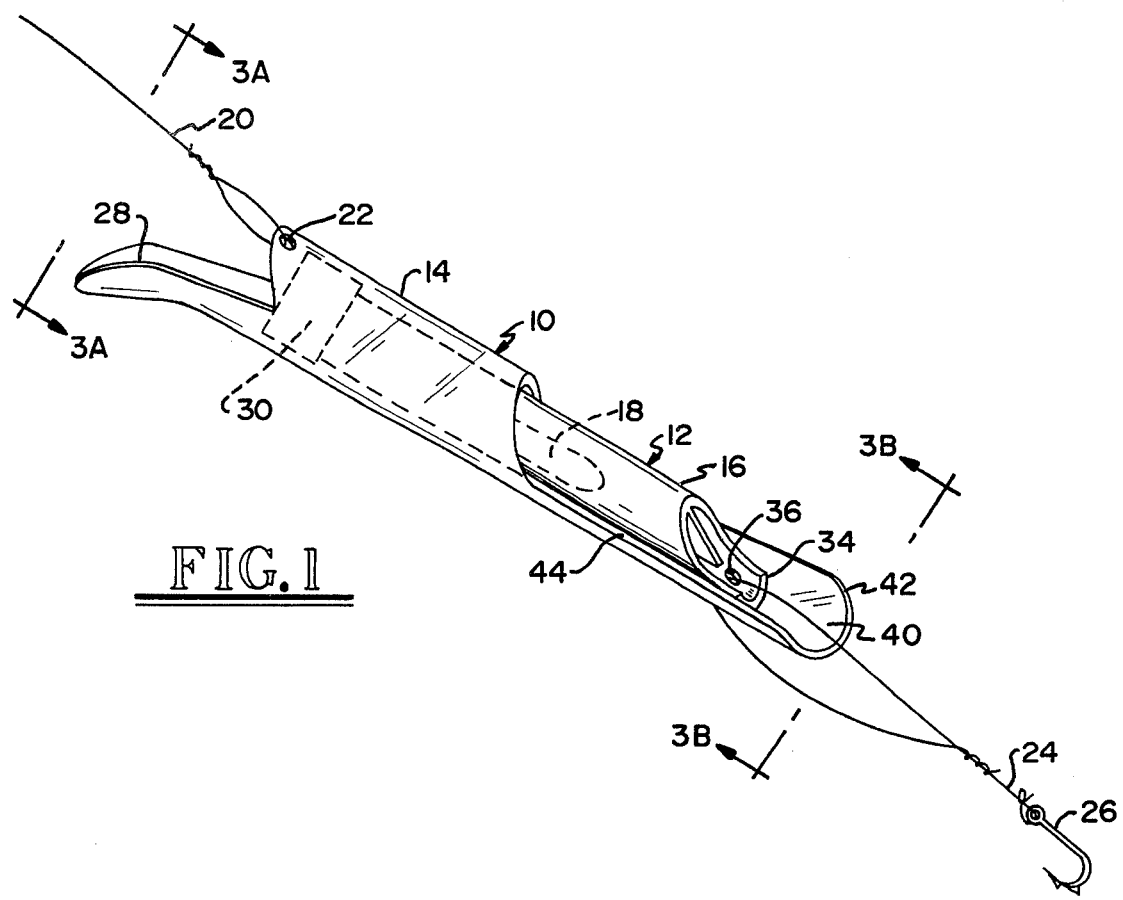
FIG. 1 is a perspective view of the lure including the tubular sheath and chemiluminescent wand attached to a fishing line and a hook.

Referring now more particularly to the perspective view of FIG. 1, lure 10 comprises a chemiluminescent wand 12 partially encased by a transparent, hollow, tubular sheath 14. The wand 12 includes an outer flexible casing 16 and an inner enclosed frangible tube 18, shown in dotted line in FIG. 1, which is encompassed by the outer casing. A first reactant chemical is encased in the inner enclosed tube 18 and a second reactant chemical is encased between the outer casing 16 and the tube 18. To prevent moisture from contaminating the second chemical, the outer casing may be lined with a thin impervious liner. When the outer casing 16 is deformed by bending, the inner frangible tube 18 fractures and allows the two chemicals, which are selected for their chemiluminescent properties during reaction, to mix and generate the chemiluminescence.

The lure 10 is shown attached at its leading end of the sheath 14 to a flexible leader 20. Since the lure 10 is intended to be moved relative to the water in which it is submerged, either by being pulled through stationary water or by being held stationary in moving water, the upstream end of the lure and sheath will hereinafter be referred to as the leading end and the downstream end of the lure will be referred to as the trailing end. The flexible leader 20 is preferably of steel and is looped at one end through a hole 22 in the leading end of the sheath 14. The trailing end of the sheath 14 is connected to a leader or line 24 which is attachable to a hook 26, artificial lure or other means for catching fish. The main body of the sheath 14 encompasses a portion of the chemiluminescent wand 16. The sheath 14 is preferably fabricated from a transparent, tubular material such as an acrylic plastic.

Figure 3A:
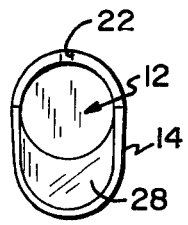
FIGS. 3A and 3B are opposite end views of the lure taken generally along the lines 3A—3A and 3B—3B, respectively, in FIG. 1.
Figure 3B:
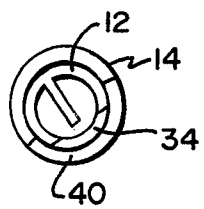

Since the wand 12 is buoyant and the sheath material has a specific gravity only slightly greater than one, it is necessary to design the shape of the sheath so as to cause it to submerge when the lure is pulled through the water. This action is accomplished by providing the sheath 14 with a rounded tongue 28 which curves away from the longitudinal axis of the sheath 14, that is it curves away from the leader 20. The tongue 28 is also concave, with respect to the longitudinal axis of the sheath 14 and the leader 20, as can be seen in FIG. 3A. This feature, together with the sheath density which is slightly greater than water, causes the lure to dive and overcome the buoyancy of the wand 12 when the lure is moved forward relative to the water.

The wand 12 is provided with an enlarged diameter portion or head 30 at the leading end. A detent 32 (best seen in FIG. 2) in the sheath 14 acts as a stop against the head 30 to prevent the wand 12 from sliding out of the sheath 14 in the trailing direction. The wand 12 has a protruding flange 34 at its trailing end and this flange is provided with hole 36 which registers with a hole 38 in the trailing end of the sheath 14. A clip or loop of line can then be passed through the two holes 36 and 38 to secure the wand 12 in the sheath 14.

Figure 2:
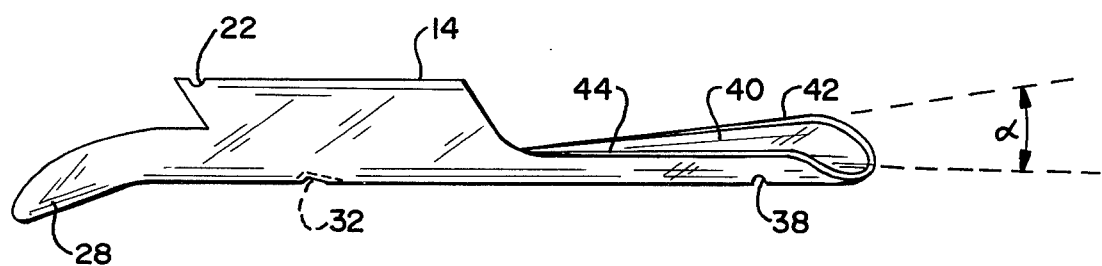
FIG. 2 is a side elevational view of the lure sheath depicted in FIG. 1.

In order to cause the lure 10 to wobble while it is moved relative to the water, the latter half of the sheath is partially cut away to leave a scoop-shaped portion 40 which extends along the length of the wand 12 and partially encompasses it. As best seen in FIG. 2, one of the longitudinal edges 42 of the scoop-shaped portion 40 is skewed with respect to its other longitudinal edge 44, that is, the edges 42 and 44 are non-parallel. As viewed from the side in FIG. 2, a hypothetical extension of the edge 42 is at an angle alpha ($\alpha$) with respect to a similar hypothetical extension of the edge 44. This angle alpha is a design criteria and may be 30°, for example. This skewed edge arrangement causes an unstable imbalance of the water forces acting on the lure 10 when it is pulled and these make the lure 10 wobble in a swimming fashion. Another helpful factor in causing an imbalance in the water forces acting on the lure 10 is that the edges 42 and 44 at the point where they join the main body of the sheath 14 lie in a plane which is non-parallel to the plane in which the edges of the tongue 28 lie at the point where they depart from the main body portion of the sheath 14.

While the sheath 14 is described above as being transparent in other embodiments, it may be translucent or even lucent in other embodiments, it may be opaque in order to provide a control over the luminosity of the wand 12 in the manner described in my preceding application referred to above. This is desirable because bright light attracts large fish and subdued light (restricted area of exposure) attracts small or smaller fish. The most effective luminosity also varies according to such factors as the temperature of the water, the depth, etc. In such embodiments, the sheath 14 is preferably made of a material which may be easily cut away to selectively expose more of the wand to accommodate variances in fish size, type, habits and/or habitats, etc.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An illuminated fishing lure attachable to a fishing line for attracting fish, squid and other aquatic life comprising:
   a chemiluminescent wand having a first chemical in an inner frangible tube and a second chemical in an outer flexible casing encompassing the inner tube, wherein the chemicals when mixed, by deforming the outer casing and fracturing the inner tube, generate a chemiluminescence;
   a tubular sheath having a trailing end and a curved leading end, and being mounted about a portion of the chemiluminescent wand for causing the wand and sheath to submerge and wobble when the sheath and wand are moved relative to the water, the trailing end of the sheath partially encompassing the wand and having non-parallel longitudinal edges for causing an unstable, imbalance of the water forces acting on the lure when it is moved relative to the water, the wand and sheath together being less dense than the water; and
   means for attaching the wand and sheath to the fishing line.

2. An illuminated fishing lure attachable to a fishing line for attracting fish, squid and other aquatic life comprising:
   a chemiluminescent wand having a first chemical in an inner frangible tube and a second chemical in an outer flexible casing encompassing the inner tube, wherein the chemicals when mixed, by deforming the outer casing and fracturing the inner tube, generate a chemiluminescence;
   a tubular sheath having a main body portion, a leading, tongue portion extending from the main body portion and which curves away from the fishing line, and a trailing portion which is semicylindrical and has non-parallel longitudinal edges, the sheath being mounted about a portion of the chemiluminescent wand for causing the wand and sheath to submerge and wobble when the sheath and wand are moved relative to the water, the wand and sheath together being less dense than the water; and
   means for attaching the wand and sheath to the fishing line.

3. An illuminated fishing lure as recited in claim 2 wherein the tongue portion has a pair of edges which lie in a first hypothetical plane at the point where the tongue portion joins the main body portion, the non-parallel longitudinal edges of the trailing portion extend from the main body portion and lie in a second hypothetical plane at the point where they join the main body portion, and wherein the first and second hypothetical planes are non-parallel.

4. An illuminated fishing lure attachable to a fishing line for attracting fish, squid and other aquatic life comprising:
- a chemiluminescent wand having a first chemical in an inner frangible tube and a second chemical in an outer flexible casing encompassing the inner tube, wherein the chemicals when mixed, by deforming the outer casing and fracturing the inner tube, generate a chemiluminescence; and
- a tubular sheath having a trailing end, a curved leading end, and being mounted about a portion of the chemiluminescent wand for causing the wand and sheath to submerge and wobble when the sheath and wand are moved relative to the water, the wand and sheath together being less dense than the water, and wherein the wand has a flange portion at one end, the flange having a hole in it, and a head at the other end of diameter greater than the diameter of the wand at the one end, the sheath has a detent which abuts against the wand head, and means for attaching the wand and sheath to a fishing line including a flexible leader having a loop at one end which loops through the wand flange hole and through a hole at one end of the sheath which is in registration with the wand flange hole, and thereby restrains the wand, and hook means attached to the leader at its opposite end.

5. A luminous fishing lure attachable to a fishing line and adaptable for being submerged in and moved relative to a body of water comprising:
- an elongated source of light;
- a hollow sheath slidably mounted on the light source, the sheath having leading and trailing ends with respect to the direction of movement of the lure relative to the water, a tongue extending from the leading end of the sheath and in a direction away from the fishing line, and a semicylindrical portion at the trailing end which has non-parallel longitudinal edges, whereby the sheath tongue causes the moving lure to submerge and the non-parallel longitudinal sheath edges of the semicylindrical portion cause the moving lure to wobble.

6. A luminous fishing lure as recited in claim 5 wherein the sheath is made of a material which is translucent.

* * * * *